United States Patent [19]

Foos et al.

[11] Patent Number: 5,702,608
[45] Date of Patent: Dec. 30, 1997

[54] PROCESS AND INSTALLATION FOR THE DECONTAMINATION OF RADIOACTIVE NITRIC EFFLUENTS CONTAINING STRONTIUM AND SODIUM

[75] Inventors: Jacques Foos, Orsay; Alain Guy, Pont Carbe; Marc Lemaire, Villeurbanne; Bruno Leclere, Cherbourg; Gérard Le Buzit, Crosne; Pierre Doutreluingne, Cherbourg, all of France

[73] Assignee: Compagnie Generales Des Matieres Nucleaires, Velizy-Villacoublay, France

[21] Appl. No.: 571,847

[22] PCT Filed: Jul. 7, 1994

[86] PCT No.: PCT/FR94/00840

§ 371 Date: Feb. 5, 1996

§ 102(e) Date: Feb. 5, 1996

[87] PCT Pub. No.: WO95/02250

PCT Pub. Date: Jan. 19, 1995

[30] Foreign Application Priority Data

Jul. 8, 1993 [FR] France ............................ 93/08417

[51] Int. Cl.$^6$ ............................................. C02F 1/42
[52] U.S. Cl. ................. 210/668; 210/669; 210/670; 210/673; 210/682; 210/912
[58] Field of Search ........................ 210/682, 663, 210/668, 669, 912, 688; 423/181, 670, 673

[56] References Cited

U.S. PATENT DOCUMENTS

| | | | |
|---|---|---|---|
| 3,032,497 | 5/1962 | Rhodes et al. | 210/912 |
| 3,154,500 | 10/1964 | Jansen, Jr. et al. | 423/2 |
| 3,173,757 | 3/1965 | Wheelwright | 423/157 |
| 3,694,369 | 9/1972 | Orlandini | 210/682 |
| 4,642,203 | 2/1987 | Matsunaga et al. | 210/669 |
| 4,749,518 | 6/1988 | Davis, Jr. et al. | 423/181 |
| 4,764,281 | 8/1988 | Elfine | 210/669 |
| 4,764,284 | 8/1988 | Jansen | 210/912 |
| 4,770,783 | 9/1988 | Gustausson et al. | 210/669 |
| 4,861,493 | 8/1989 | Jansen | 210/912 |
| 5,100,585 | 3/1992 | Horwitz et al. | 210/682 |
| 5,110,474 | 5/1992 | Horwitz et al. | 210/634 |
| 5,167,938 | 12/1992 | Heaton et al. | 210/681 |
| 5,346,618 | 9/1994 | Horwitz et al. | 210/502.1 |
| 5,366,634 | 11/1994 | Vijayan et al. | 210/669 |

FOREIGN PATENT DOCUMENTS 0 216 473  4/1987  European Pat. Off. .
WO91/15280  10/1991  WIPO .

OTHER PUBLICATIONS

Database WPI, Section Ch, Week 8930, Derwent Publications Ltd., London, GB; Class SE19, AN 89-213674 & DD, A 264 134 (Akad Wissenschaft Dor) 22 Feb. 1989.

Database WPI, Section Ch, Week 8519, Derwent Publications Ltd., London, GB; Class E13, AN 85-110721 & DD, A 217 190 (Akad Wissenschaft Dor) 9 Jan. 1985.

*Primary Examiner*—Cynthia L. Nessler
*Attorney, Agent, or Firm*—Pearne, Gordon, McCoy & Granger LLP

[57] ABSTRACT

The invention relates to a process and an installation for the decontamination of radioactive nitric effluents containing strontium and sodium. According to this process, contacting takes place in 1 of the aqueous effluent with an organic phase incorporating a crown ether such as DCH18C6 and a diluent such as $CHCl_3$, in order to selectively extract the strontium with respect to the sodium, followed by the reextraction of the strontium in an aqueous solution in 3, followed by fixing in 5 on a cation exchange resin. This leads to a high strontium decontamination level with a very high concentration factor.

13 Claims, 1 Drawing Sheet

PROCESS AND INSTALLATION FOR THE DECONTAMINATION OF RADIOACTIVE NITRIC EFFLUENTS CONTAINING STRONTIUM AND SODIUM

BACKGROUND OF THE INVENTION AND RELATED ART

The present invention relates to a process for the decontamination of radioactive nitric aqueous effluents containing strontium, particularly in trace form, and sodium. Such effluents are more particularly obtained in spent nuclear fuel reprocessing installations.

In such installations, the reprocessing operations start with a dissolving of the fuel in nitric acid followed by a series of extraction-reextraction stages by means of an organic solvent based on tributyl phosphate in order to separate from the dissolving nitric solution the three following fractions:

the uranium stored in nitric solution,
the plutonium which will be brought into the form of plutonium oxide powder and
fission products and other uranides, which will be trapped in a glass matrix.

All these operations give rise to liquid effluents which, although only being weakly radioactive, must still undergo decontamination. These effluents have a composition which normally fluctuates around the following values:

$H^+$: 0.5 to 1.3N,
$Na^+$: 0.05 to 0.15M,
$NO_3^-$: 0.5 to 1.5M,
U: a few dozen mg/l,
Pu: a few dozen µg/l,
$^{137}Cs$, $^{106}Ru$, $^{134}Cs$: less than 1 mg/l for each radioactive element, and
Sr: approximately 2 µg/l.

It is therefore necessary to eliminate all troublesome products from these effluents. In the case of strontium, this can in particular be performed by a coprecipitation with barium sulphate, which entrains between 90 and 95% of the radioactive element. However, this process suffers from the disadvantage of producing a significant quantity of sludge, namely 3.5 l per 1 m$^3$ of treated effluents.

Another process for the recovery of strontium from acid solutions uses the solvent extraction method, using a crown ether in a diluent able to dissolve a certain quantity of water, e.g. an alcohol such as octanol. This process described in U.S. Pat. No. 5,100,585 is suitable for the extraction of strontium from solutions having a nitric acid concentration up to 6 mole/l, but it does not make it possible to obtain a high strontium extraction selectivity compared with the sodium in the case of effluents having relatively high sodium quantities compared with the strontium quantities.

The strontium elimination process must meet certain industrial demands, particularly with regards to the concentration factor. Thus, the displacement of the strontium in a new volume of the same order of magnitude as that of the effluent, leads to doubling the effluent quantity to be conditioned, which solves no problem at all and even aggravates the situation.

In addition, the concentration of the strontium by selectively separating it from the sodium and its fixing on a matrix compatible with a definitive conditioning constitute the objective to be achieved in a process for the decontamination of effluents containing both strontium and sodium.

SUMMARY OF THE INVENTION

The present invention specifically relates to a process for the decontamination of radioactive nitric aqueous effluents containing strontium and sodium, which permits the selective separation of the strontium and the fixing thereof to a matrix permitting its definitive conditioning by vitrification.

The process according to the invention comprises the following stages:

a) contacting the aqueous effluent with an organic phase incorporating a crown ether and a diluent, chosen so as to obtain an extraction selectivity of strontium compared with sodium such that the $D_{Sr}/D_{Na}$ ratio, in which $D_{Sr}$ and $D_{Na}$ respectively represent the strontium and sodium distribution coefficients, is equal to or above 100 and $D_{Sr}$ is at least equal to 1, b) reextracting the strontium present in the organic phase in an aqueous solution, and c) fixing the strontium reextracted in said aqueous solution on a cation exchange resin.

This process is more particularly applicable to nitric effluents having a nitric acidity of 0.5 to 2N, a strontium concentration up to 1 µg/l and a sodium concentration of 0.01 to 0.2 mole/l, i.e. effluents containing much more sodium than strontium.

Through the choice of an appropriate organic phase favouring the selective extraction of strontium compared with sodium, with the process of the invention it is possible to isolate the strontium from such effluents, then concentrate it on a cation exchange resin with a high concentration factor, e.g. 5000, which permits the definitive conditioning of the strontium under good conditions.

In this process, the high selectivity can be obtained by choosing an appropriate diluent-crown ether pair. It is also possible to act on the selectivity by choosing a particular crown ether isomer or an appropriate crown ether concentration.

The crown ether can be of a random nature, e.g. one of those described in the book by E. Weber "Crown Compounds—Properties and Practice", pp 34–82.

Preference is given to the use of crown ethers having 6 oxygen atoms such as those complying with the following formula:

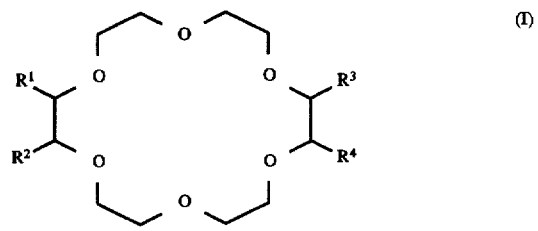

(I)

in which $R^1$, $R^2$, $R^3$ and $R^4$, which can be the same or different represent a hydrogen atom or an alkyl group with 1 to 18 carbon atoms, or in which $R^1$ and $R^2$ and/or $R^3$ and $R^4$ form with the two carbon atoms with which they are linked, a saturated or aromatic hydrocarbon cycle with 6 carbon atoms.

As an example of crown ethers of this type reference is made to DCH18C6 of formula:

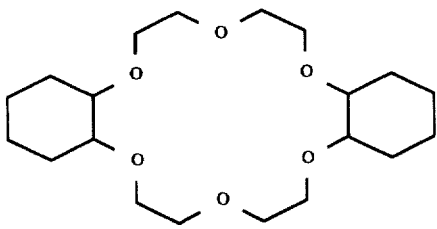

(II)

hexyl-18C6, decyl-18C6 and dodecyl-18C6.

Good results are more particularly obtained with DCH18C6 in the form of a mixture of its isomers or in the form of its cis-syn-cis isomer with chlorinated diluents, or its cis-anti-cis isomer with benzene diluents.

Thus, in the case of DCH18C6, said crown ether is generally obtained in the form of a mixture of isomers, whereof the two main isomers are the cis-syn-cis isomer and the cis-anti-cis isomer, which in each case represent approximately 40% of the mixture. Although the cis-syn-cis isomer brings about a better strontium extraction than the cis-anti-cis isomer, preference can be given to the latter in the case of benzene diluents, because in this case it has a better extraction selectivity of strontium with respect to sodium.

The diluents used are chosen so as to form with the crown ether a pair having good properties for the selective extraction of strontium compared with sodium.

In addition, choice is made of a diluent having satisfactory properties for liquid-liquid extraction in the reprocessing of nuclear fuels, namely
- physical characteristics leading to industrially acceptable phase dispersion and separation times after contact (density sufficiently different from unity, low viscosity, average interfacial tension, etc.),
- a good chemical stability under nuclear radiation,
- a negligible solubility in the aqueous phase (the treatment of 30000 m$^3$ of effluent annually using a 1 vol. % soluble diluent leads to a diluent loss of 300 m$^3$),
- a high dissolving power with respect to the crown ether and the crown ether/Sr coronate,
- a low toxicity,
- a high clear point,
- low corrosion with respect to the materials used and
- a reasonable price, being commercially available.

As an example of the diluent which can be used, reference can be made to chlorinated solvents such as 1,1,2,2-tetrachloroethane, chloroform, dichloromethane and 1,2-dichloroethane and benzene solvents such as nitrobenzene, benzonitrile, chlorobenzene, bromobenzene, 1,2-dichlorobenzene and 1-chloronaphthalene.

For performing the first stage of the process according to the invention, contacting takes place between the aqueous effluent to be treated and the organic phase incorporating the crown ether and the diluent, in a conventional liquid-liquid extraction apparatus, e.g. a pulsed column, a mixer-settler or a centrifugal extractor, choosing the aqueous phase/organic phase volume ratios, the crown ether concentration of the organic phase and the contacting times in such a way as to obtain the optimum results. It is possible to work at ambient temperature or at a higher temperature.

Generally the crown ether concentration of the organic phase is 0.001 to 0.15 mole/l.

In this first stage, the strontium is preferably extracted in the organic phase with a little sodium, but as a result of the choice of the organic phase, particularly the crown ether-diluent pair, the sodium extraction is limited to a very low value, although it is present in the effluent in a much larger quantity than the strontium.

Following said first extraction stage, reextraction takes place of the strontium in an aqueous solution by contacting the organic phase containing the strontium with the aqueous solution, once again using a conventional liquid-liquid extraction apparatus.

The aqueous solution used can be water or a weakly acid aqueous solution, e.g. having an acidity below 0.1N.

In said second stage, the strontium is reextracted in the aqueous solution with part of the sodium extracted in the organic phase.

However, the reextracted sodium quantity remains very low due to the high selectivity obtained in the first stage and the low concentration of the $NO_3^-$ ion in the aqueous rextraction phase, which is favourable for the extraction of divalent cations.

Following strontium reextraction in said aqueous solution, the strontium containing aqueous solution is contacted with a cation exchange resin in order to fix the strontium to the resin. The cation exchange resin can be in $H^+$ form.

The cation exchange resins used are e.g. organic resins having an insoluble matrix, which carry acid ionic groups of the type $HSO_3$ or COOH.

Preference is given to the use of a sulphonic resin, e.g. a sulphonic polystyrene resin like that marketed by Rohm & Haas under the name DUOLITE ARC 9651 and which has the following characteristics:
Skeleton: macroporous crosslinked polystyrene
crosslinking rate: 20%
functional group: $HSO_3$ (supplied in acid form)
Appearance: balls with a diameter of 0.4 to 1.2 mm
total capacity: 1.8 meq/ml.

The use of such resins for fixing strontium is of interest, because it is possible to either directly condition the resin by vitrification, or recover the strontium by elution using a 1 to 5N nitric solution and thus regenerate the resin, which can consequently be reused.

The present invention also relates to an installation for the decontamination of radioactive effluents for performing said process and which comprises:
a) a first liquid-liquid extraction device for contacting the effluent with the organic phase incorporating the crown ether and the diluent,
b) a second liquid-liquid extraction device for the reextraction in an aqueous solution of the strontium extracted in the organic phase,
c) a cation exchange resin column for fixing the strontium,
d) means for fixing the aqueous effluent to be decontaminated in the first liquid-liquid extraction device,
e) a first treatment circuit for bringing about a continuous circulation of the organic liquid phase in the first and second liquid-liquid extraction devices and
f) a second treatment circuit for the continuous circulation of the aqueous reextraction solution in the second liquid-liquid extraction device and in the cation exchange resin column.

Advantageously, said installation also comprises:
means for sampling part of the aqueous solution of the second circuit and recycling it in the first liquid-liquid extraction device with the effluent to be decontaminated and
means for introducing water into the second circuit.

BRIEF DESCRIPTION OF THE DRAWINGS

Other features and advantages of the invention can be better gathered from the following non-limitative description with reference to the attached drawings, wherein show.

DETAILED DESCRIPTION OF THE INVENTION

Figure 1:
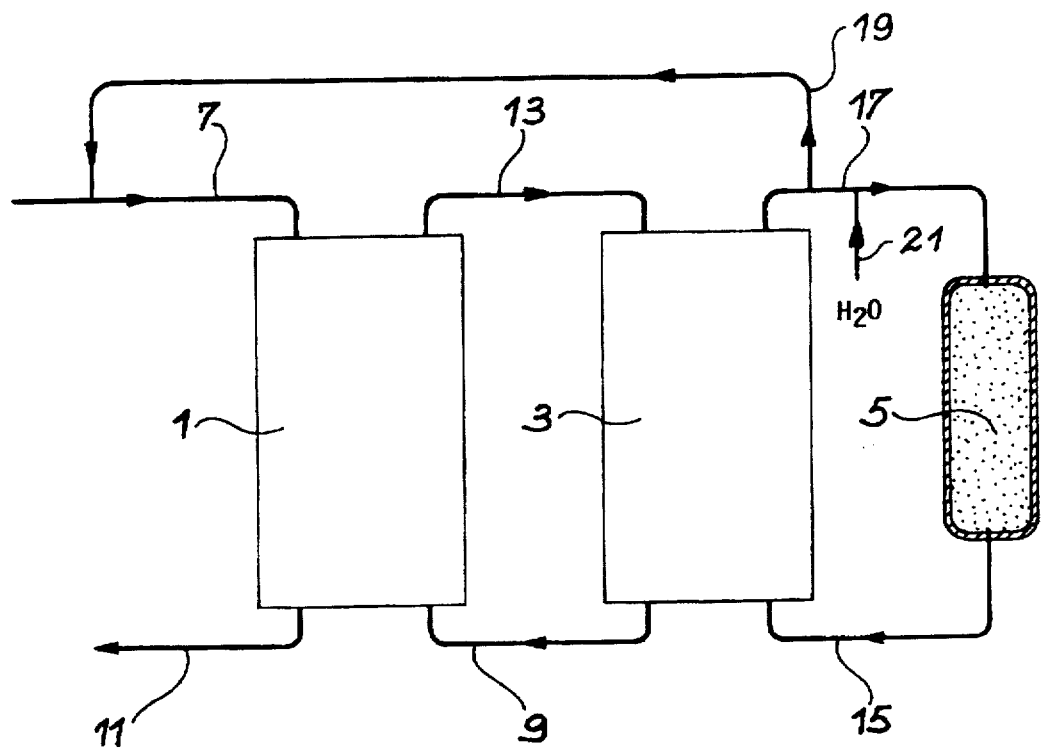
FIG. 1 Diagrammatically an installation for the decontamination of radioactive nitric effluents using the process according to the invention.

FIG. 1 shows that the installation comprises a first liquid-liquid extraction device 1, a second liquid-liquid extraction device 3 and a cation exchange resin column 5.

The aqueous effluent to be treated is introduced by the line 7 into the liquid-liquid extraction device 1, where it is contacted with the organic phase introduced by the line 9. Thus, recovery takes place by the line 11 at the outlet of the device 1 of the decontaminated aqueous effluent and by the line 13 of the organic phase which has extracted the strontium and sodium traces. This organic phase is then introduced by the line 13 into the second extraction device 3, where it is contacted with an aqueous reextraction solution introduced by the line 15.

At the outlet from the device 3 recovery takes place of a purified organic phase, which is recycled by the line 9 in the first extraction device 1 and a strontium-containing aqueous solution which is discharged by the line 17 into the cation exchange resin column 5. In said column 5, the strontium is fixed to the resin and recovery takes place at the outlet from the column of an aqueous solution which is recycled in the extracted device 3 for again reextracting the strontium.

Thus, in said installation, circulation takes place in a first closed circuit 13, 9 of the organic liquid strontium extraction phase and circulation takes place in a second closed circuit 15, 17 of the aqueous reextraction solution. In the second circuit, the aqueous reextraction solution is gradually filled with $NO_3^-$ ions and $H^+$ ions coming from the resin and consequently becomes acid, which can be prejudicial, because the reextraction selectivity of strontium with respect to sodium decreases when the $HNO_3$ content of the aqueous solution increases.

To obviate this disadvantage, periodically or continuously sampling takes place by the line 19 of part of the aqueous reextraction solution passing out of the reextraction column and it is recycled to the intake of the extraction device, where it is added to the effluent to be decontaminated. This sampling is obviously compensated by an equivalent water top-up in the second circuit using the line 21.

The following examples illustrate embodiments of the process according to the invention.

EXAMPLES 1 TO 10

In these examples a study is made of the influence of the diluent on the result obtained in the first stage of the process of the invention when the crown ether used is DCH18C6.

In these examples, contacting takes place of 1 volume of an aqueous effluent containing 0.1 mole/l of $Na^+$ and 235 μg/l of strontium $Sr^{2+}$, having an acidity of 0.9N and a nitrate ion concentration of 1 mole/l, with 1 volume of organic phase constituted by the tested diluent containing 0.1 mole/l of the crown ether DCH18C6.

After contacting the effluent with the organic phase, accompanied by stirring for 15 min. separation takes place of the two phases and their strontium and sodium concentrations are determined. On the basis of these results, determination takes place of the distribution coefficients $D_{Sr}$ and $D_{Na}$, which correspond to the ratios of the concentration in the element (strontium or sodium) in the organic phase to the concentration of said same element in the aqueous phase. On the basis of $D_{Sr}$ and $D_{Na}$, determination takes place of the selectivity of the organic phase for strontium by the ratio $D_{Sr}/D_{Na}$. The results obtained and the tested diluents appear in table 1.

This table also indicates certain characteristics of the tested diluent, such as its density, its solubility in water (in wt. %), its clear point and the DCH18C6 loss in water (when using 0.1 mole/l in the diluent).

Table 1 shows that the best results are obtained when using as the diluent with DCH18C6, chlorinated diluents and in particular chloroform.

For comparison purposes, said table also gives the results obtained when using as the diluent an alcohol (heptanol, octanol and decanol) such as those recommended in U.S. Pat. No. 5,100,585.

Under these conditions, the extraction selectivity with respect to strontium is considerably inferior being approximately 10 to 12. Moreover, the DCH18C6 losses are much lower with the diluents used in the invention.

EXAMPLES 11 TO 19

These examples study the influence of the pair formed by the crown ether and the diluent used for the selective extraction of strontium in the first stage of the process according to the invention.

These examples follow the same operating procedure as in examples 1 to 10 using as the diluent chloroform, nitrobenzene or benzonitrile containing 0.1 mole/l of a crown ether constituted by DCH18C6 or complying with formula I with $R^1$ representing the hexyl, decyl or dodecyl group and $R^2$, $R^3$ and $R^4$ representing a hydrogen atom.

As hereinbefore, determination takes place of $D_{Sr}$ and $D_{Na}$, as well as the $D_{Sr}/D_{Na}$ selectivity. Determination also takes place of the distribution coefficient $D_H$ of the proton, as well as the $D_{Sr}/D_H$ selectivity.

The diluents and crown ethers used, as well as the results obtained are given in table 2.

On the basis of these results, it is clear that the selectivity is better in all cases with chloroform and is also better in all cases with DCH18C6 compared with alkyl crown ethers and that the selectivity increases with the number of carbon atoms of the alkyl group up to 10, but then drops. In the case where the solvent is benzonitrile, a satisfactory selectivity is not obtained.

EXAMPLES 20 TO 27

These examples study the influence of the crown ether isomer on the results obtained. In all these examples the same operating procedure as in examples 1 to 10 is adopted, using different diluents, either with the cis-syn-cis isomer of DCH18C6, or the cis-anti-cis isomer of DCH18C6.

The results obtained appear in table 3. This table also shows the results obtained in the case of isomer mixtures, i.e. the results which correspond to examples 2, 3, 5 and 6 of table 1.

These results make it clear that the cis-syn-cis isomer leads to a better strontium extraction than the cis-anti-cis isomer, but the selectivity is better with the cis-anti-cis isomer when using a benzene diluent and is better or equivalent to that of the cis-syn-cis isomer with the isomer mixture when a chlorinated diluent is used.

EXAMPLE 28

This example uses an installation like that shown in the attached FIG. 1 for the treatment of an aqueous effluent having the following composition:

$H^+ = 0.9N$
$Na^+ = 0.1$ mole/l
$NO_3^- = 1$ mole/l and
$Sr^{2+} = 2$ µg/l,
and using an organic phase constituted by chloroform containing 0.022 mole/l of DCH18C6 (isomer mixture) for the extraction of strontium, water for the reextraction of strontium and a Duolite ARC 9651 resin as the cation exchange resin for fixing strontium.

Figure 2:
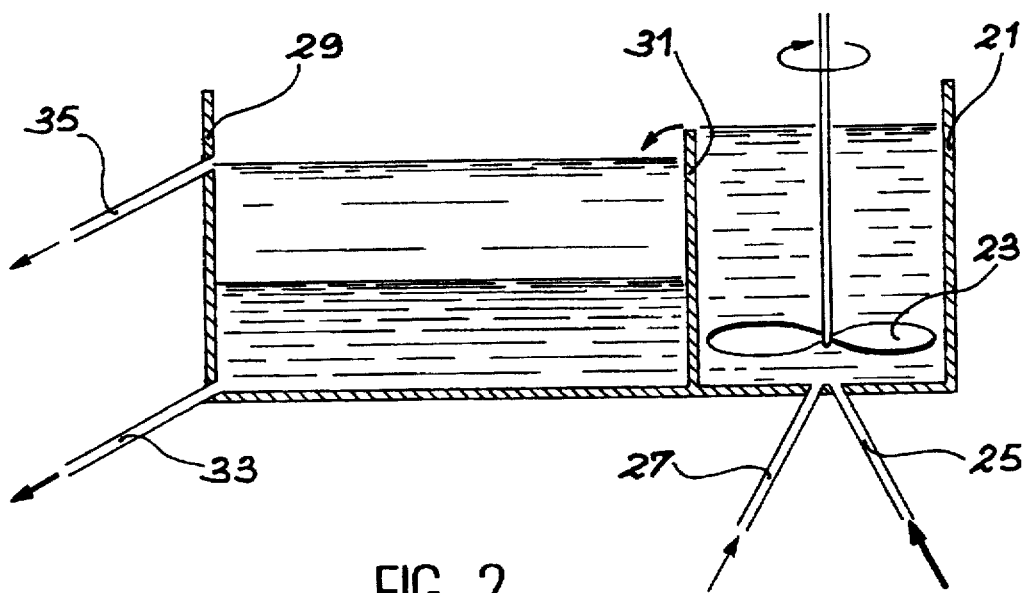
FIG. 2 Diagrammatically a mixer-settler usable in the installation of FIG. 1.

In the extraction device (1) and reextraction device (3), use is made of three mixer-settlers in series, one of which is shown in FIG. 2. FIG. 2 shows that the mixer-settler comprises a mixing chamber 21 equipped with a turbine 23 making it possible to create the dispersion necessary for the transfer of materials between the effluent or water and the organic phase, which are respectively introduced by the lines 25 and 27. The two phases sucked up by the turbine penetrate the mixing chamber and then by flowing over the weir 31 into the settling chamber 29 where they are separated by the gravity and coalescence effect. They finally leave the settler, the light phase through the upper pipe 35 and the heavy phase through the lower pipe 33. The resin column 5 used has a height of 47 cm and a diameter of 19 mm.

For performing the process according to the invention in said installation, the effluent is circulated at a flow rate of 750 ml/h, the organic phase at a flow rate of 750 ml/h and the water at a flow rate of 750 ml/h, using the following volumes for a treatment lasting 40 h:

effluent volume: 30 l organic phase volume: 500 ml (first circuit)

aqueous phase volume: 400 ml (second circuit).

At the end of the operation, measurement takes place of the strontium concentration of the treated effluent leaving by the line 11. This concentration is 0.1 µg/l.

It is therefore possible to recover more than 95% of the strontium traces present in 30 l of nitric effluent containing a few g/l of sodium nitrate. Moreover, said strontium is trapped in 6 ml of cation exchange resin, i.e. concentrated by a factor of 5,000, which is a spectacular result compared with the previously used processes.

The regeneration of the resin and the recovery of the strontium in the aqueous phase can be brought about by washing with twice 10 ml of a 4N nitric acid solution (strontium recovery above 95%). The solution obtained only contains a little sodium and can then be supplied as it is to the vitrification operation.

TABLE 1

| Ex. | Diluent | Density (g/cm³) | Solubility in water (wt. %) | Clear point (°C.) | DCLH18C6 loss in water (vol. %) | Dsr | DNa | DSr/DNa |
|---|---|---|---|---|---|---|---|---|
| 1 | 1,1,2,2-tetrachloroethane | 1.586 | 0.29 | ININ 1) | 0.031 | 105 | 0.063 | 1700 |
| 2 | chloroform | 1.489 | 0.815 | ININ 1) | 0.048 | 25 | 0.013 | 2000 |
| 3 | dichloromethane | 1.326 | 1.3 | ININ 1) | 0.080 | 27 | 0.019 | 1500 |
| 4 | 1,2-dichloroethane | 1.252 | 0.81 | 15 | 0.35 | 14 | 0.03 | 500 |
| 5 | benzonitrile | 1.001 | 0.2 | 71 | 0.70 | 11 | 0.12 | 90 |
| 6 | nitrobenzene | 1.203 | 0.19 | 88 | 0.70 | 6.0 | 0.05 | 420 |
| 7 | chlorobenzene | 1.106 | 0.0488 | 23 | 0.84 | 1.25 | <0.01 | >100 |
| 8 | bromobenzene | 1.491 | 0.045 | 51 | 0.88 | 1.24 | <0.01 | >100 |
| 9 | 1,2-dichlorobenzene | 1.306 | 0.0156 | 65 | 0.90 | 1.05 | <0.01 | >100 |
| 10 | 1-chloronaphthalene | 1.194 | insoluble | 121 | 1.4 | 1.3 | <0.01 | >100 |
| Comp. ex. 1 | 1-heptanol | 0.822 | 0.1 | 73 | 1.5 | 0.87 | 0.07 | 12 |
| Comp. ex. 2 | 1-octanol | 0.825 | 0.0538 | 81 | 2.0 | 0.57 | 0.05 | 11 |
| Comp. ex. 3 | 1-decanol | 0.829 | <0.01 | 82 | 2.9 | 0.35 | 0.04 | 10 |

1) ININ = non-flammable

TABLE 2

| Ex. | Diluent | Crown ether | Dsr | DNa | DH | Dsr/DNa | DSr/DH |
|---|---|---|---|---|---|---|---|
| 11 | chloroform | hexyl-18C6 | 2.0 | 0.04 | 0.003 | 500 | 650 |
| 12 | | decyl-18C6 | 2.1 | 0.004 | 0.004 | 525 | 525 |
| 13 | | dodecyl-18C6 | 0.9 | 0.003 | 0.002 | 300 | 450 |
| 2 | | DCH18C6 | 25 | 0.0125 | 0.008 | 2000 | 3000 |
| 14 | nitrobenzene | hexyl-18C6 | 3.1 | 0.040 | 0.026 | 80 | 120 |
| 15 | | decyl-18C6 | 4.5 | 0.043 | 0.037 | 100 | 120 |
| 16 | | dodecy-18C6 | 1.3 | 0.027 | 0.024 | 50 | 50 |
| 6 | | DCH18C6 | 6.0 | 0.05 | 0.076 | 120 | 80 |
| 17 | benzonitrile | hexyl-18C6 | 5.0 | 0.083 | 0.070 | 120 | 80 |
| 18 | | decyl-18C6 | 7.0 | 0.089 | 0.046 | 80 | 150 |
| 19 | | dodecyl-18C6 | 2.3 | 0.055 | 0.038 | 40 | 60 |
| 5 | | DCH18C6 | 11 | 0.12 | 0.077 | 90 | 14 |

TABLE 3

| Ex. | Diluent | Isomer | DSr | DNa | DH | p (%) | DSr/DNa | DSr/DH |
|---|---|---|---|---|---|---|---|---|
| 20 | chloroform | syn | 30 | 0.015 | 0.010 | 0.06 | 2000 | 3000 |
| 21 | | anti | 15 | 0.008 | 0.006 | 0.04 | 1900 | 2500 |
| 2 | | mixture | 25 | 0.125 | 0.008 | 0.05 | 2000 | 3000 |
| 22 | dichloromethane | syn | 28 | 0.027 | 0.032 | 0.09 | 1000 | 850 |
| 23 | | anti | 18 | 0.011 | 0.017 | 0.07 | 1600 | 1000 |
| 3 | | mixture | 27 | 0.019 | 0.028 | 0.08 | 1400 | 950 |
| 24 | nitrobenzene | syn | 5.5 | 0.062 | 0.088 | 0.72 | 90 | 60 |
| 25 | | anti | 7.3 | 0.031 | 0.056 | 0.64 | 240 | 130 |
| 6 | | mixture | 6.0 | 0.05 | 0.076 | 0.70 | 120 | 80 |
| 26 | benzorlitrile | syn | 9.3 | 0.13 | 0.090 | 0.76 | 70 | 100 |
| 27 | | anti | 10 | 0.087 | 0.058 | 0.64 | 120 | 180 |
| 5 | | mixture | 11 | 0.12 | 0.077 | 0.70 | 90 | 140 |

We claim:

1. Process for the decontamination of a radioactive nitric aqueous effluent containing strontium and sodium, wherein the effluent has a nitric acidity of 0.5 to 2N, a strontium concentration up to 2 µg/l and a sodium concentration of 0.01 to 0.2 mol/l, comprising the steps of:
   a) contacting the aqueous effluent with an organic phase incorporating a crown ether and a diluent, chosen so as to obtain an extraction selectivity of strontium compared with sodium such that the $D_{Sr}/D_{Na}$ ratio, in which $D_{Sr}$ and $D_{Na}$ respectively represent the strontium and sodium distribution coefficients, is equal to or above 100 and $D_{Sr}$ is at least equal to 1,
   b) reextracting the strontium present in the organic phase in an aqueous solution, and
   c) fixing the strontium reextracted in said aqueous solution on a cation exchange resin.

2. Process according to claim 1, wherein the crown ether complies with the formula:

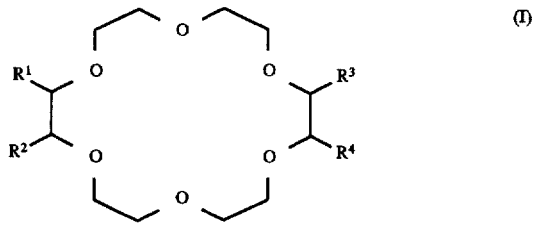

(I)

in which $R^1$, $R^2$, $R^3$ and $R^4$ which can be same or different represent a hydrogen atom or an alkyl group with 1 to 18 carbon atoms, or in which $R^1$ and $R^2$ and/or $R^3$ and $R^4$ form with the two carbon atoms to which they are linked, a saturated or aromatic hydrocarbon cycle with 6 carbon atoms.

3. Process according to claim 1, wherein the crown ether is DCH18C6 of formula:

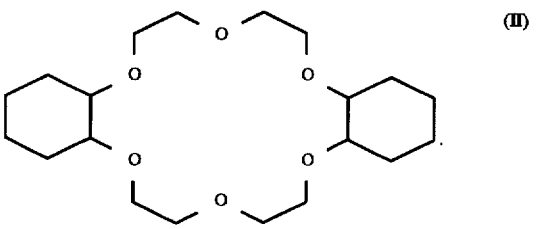

(II)

4. Process according to claim 1 wherein the diluent is chosen from among 1,1,2,2-tetrachloroethane, chloroform, dichloromethane, 1,2-dichloroethane, nitrobenzene, benzonitrile, chlorobenzene, bromobenzene, 1,2-dichlorobenzene and 1-chloronaphthalene.

5. Process according to claim 3, wherein the organic phase is constituted by the crown ether DCH18C6 in the form of a mixture of its isomers or in the form of its cis-syn-cis isomer and in that the diluent is chloroform.

6. Process according to any claim 1 wherein the crown ether concentration of the organic phase is $10^{-3}$ to 0.15 mole/l.

7. Process according to claim 1 wherein the aqueous strontium reextraction solution has an acidity below 0.1N.

8. Process according to claim 1 wherein the cation exchange resin is sulphonated polystyrene.

9. Process according to claim 1 wherein the strontium fixed to the cation exchange resin is recovered by washing it with a 1 to 5N nitric acid solution.

10. Process according to claim 1 wherein the aqueous effluent has a nitric acidity of 0.5 to 2N, a strontium concentration up to 1 µg/l and a sodium concentration of 0.01 to 0.2 mole/l.

11. Process according to claim 3, characterized in that the diluent is chosen from among 1,1,2,2-tetrachlorethane, chloroform, dichloromethane, 1,2-dichloroethane, nitrobenzene, benzonitrile, chlorobenzene, bromobenzene, 1,2-dichlorobenzene and 1-chloronaphthalene.

12. Process according to claim 1, wherein step (a) includes circulating the effluent and the organic phase in a first liquid-liquid extraction device, and withdrawing organic phase from the first liquid-liquid extraction device, step (b) includes circulating the organic phase withdrawn from the first liquid-liquid extraction device into a second liquid-liquid extraction device wherein the aqueous solution is circulated to reextract strontium from the withdrawn organic phase into the aqueous solution, recycling the organic phase from the second liquid-liquid extraction device into the first liquid-liquid extraction device, and step (c) includes circulating the aqueous solution from the second liquid-liquid extraction device into a cation exchange resin column for fixing the strontium on the cation exchange resin, withdrawing aqueous reextraction solution from the cation exchange resin column and recycling the aqueous reextraction solution from the cation exchange resin column into the second liquid-liquid extraction device.

13. Process according to claim 12, wherein a portion of the aqueous reextraction solution is recycled from the second liquid-liquid extraction device into the first liquid-liquid extraction device, and water is added to the aqueous reextraction solution.

* * * * *

UNITED STATES PATENT AND TRADEMARK OFFICE
CERTIFICATE OF CORRECTION

PATENT NO. : 5,702,608
DATED : Dec. 30, 1997
INVENTOR(S) : Jacques Foos et al.

It is certified that error appears in the above-indentified patent and that said Letters Patent is hereby corrected as shown below:

On the cover page, Section [75], Inventors:, line 2, delete "Carbe" and insert --Carre--.

On the cover page, Section [57], delete the Abstract and insert the following:

--A process and an apparatus for the decontamination of radioactive nitric effluents containing strontium and sodium is disclosed. The aqueous effluent is contacted with an organic phase including a crown ether such as DCH18C6 and a diluent such as $CHCl_3$ to selectively extract the strontium with respect to the sodium. The strontium is reextracted from the organic phase with an aqueous solution. The strontium in the aqueous solution is then fixed on a cation exchange resin.--

Column 2, line 60, after "different", insert a comma.

Column 5, line 57, "235" should not be bolded.

Column 8, Table 1, line 12, Ex. 6, delete "420" and insert --120--.

Column 8, Table 2, line 11, Ex. 16, delete "dodecy" and insert --dodecyl--.

Column 9, Table 3, line 14, Ex. 26, delete "benzorlitrile" and insert --benzonitrile--.

UNITED STATES PATENT AND TRADEMARK OFFICE
CERTIFICATE OF CORRECTION

PATENT NO. : 5,702,608

DATED : Dec. 30, 1997

INVENTOR(S) : Jacques Foos et al.

It is certified that error appears in the above-identified patent and that said Letters Patent is hereby corrected as shown below:

Column 9, line 45, after "different" inset a comma.

Column 9, line 63, (claim 4, line 1), after "claim 1" insert a comma.

Column 10, line 22, (claim 6, line 1), delete "any".

Column 10, line 22, (claim 6, line 1), insert a comma after "claim 1".

Column 10, line 25, (claim 7, line 1), insert a comma after "claim 1".

Column 10, line 27, (claim 8, line 1), insert a comma after "claim 1".

UNITED STATES PATENT AND TRADEMARK OFFICE
CERTIFICATE OF CORRECTION

PATENT NO. : 5,702,608
DATED : Dec. 30, 1997
INVENTOR(S) : Jacques Foos et al.

It is certified that error appears in the above-identified patent and that said Letters Patent is hereby corrected as shown below:

Column 10, line 30, (claim 9, line 1), insert a comma after "claim 1".

Column 10, line 32, (claim 10, line 1), insert a comma after "claim 1".

Signed and Sealed this

Fifteenth Day of September, 1998

Attest:

BRUCE LEHMAN

Attesting Officer

Commissioner of Patents and Trademarks